May 7, 1935.　　C. T. HOFFMAN ET AL　　2,000,021
ICE CREAM FREEZER
Filed Nov. 7, 1930　　2 Sheets-Sheet 1
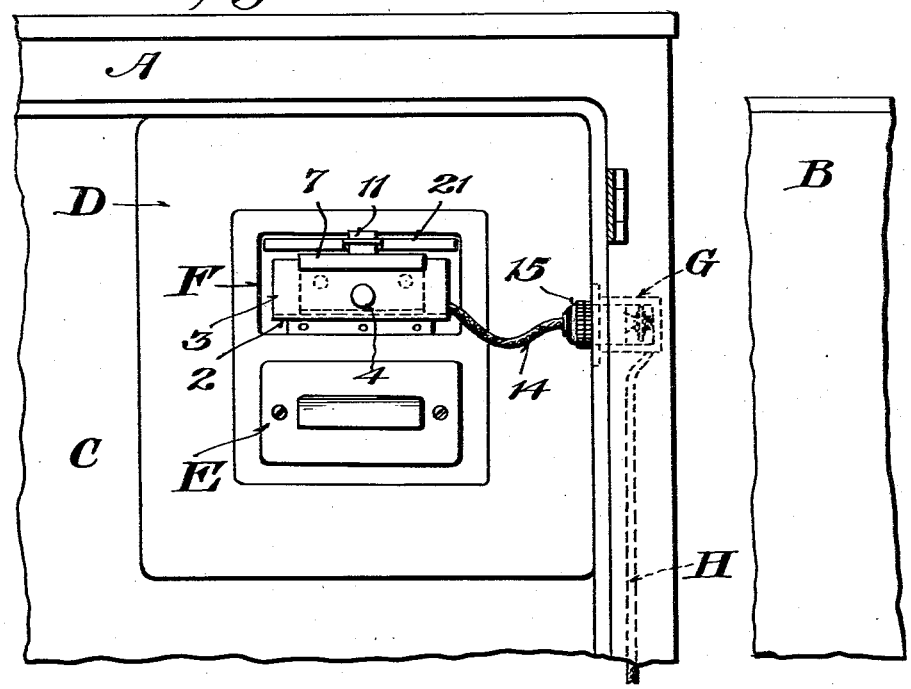
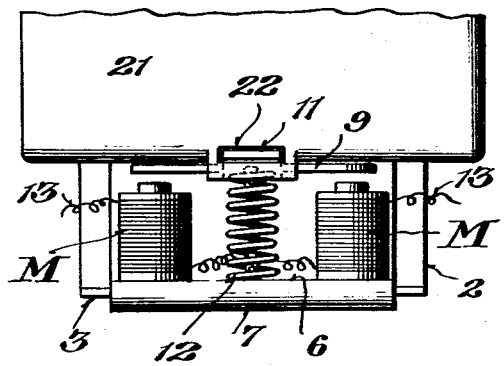
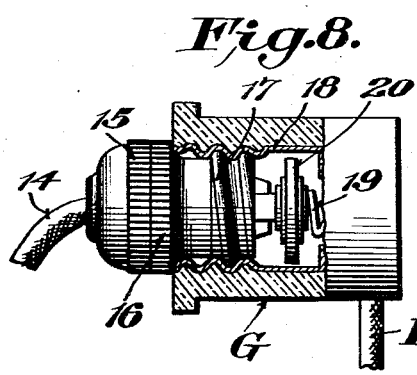
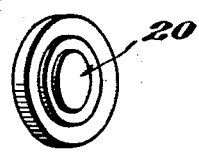
Inventors
Charles T. Hoffman
Emory L. Groff,
By
Attorney

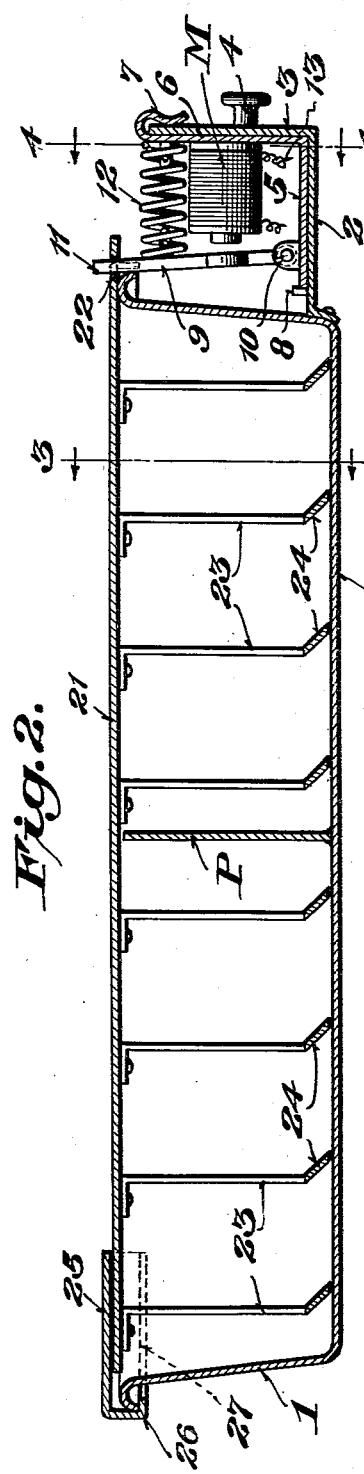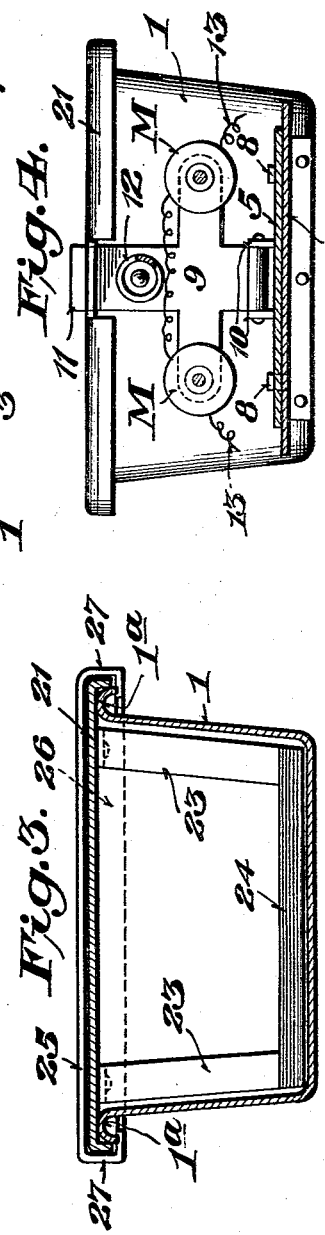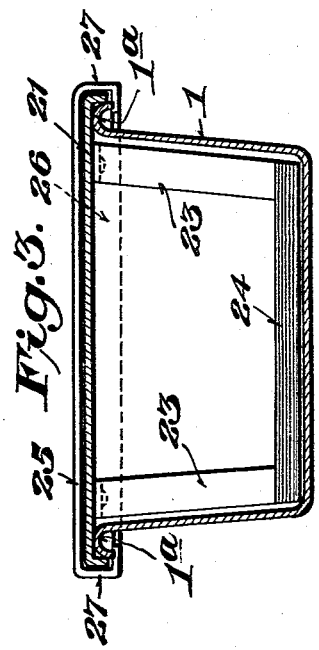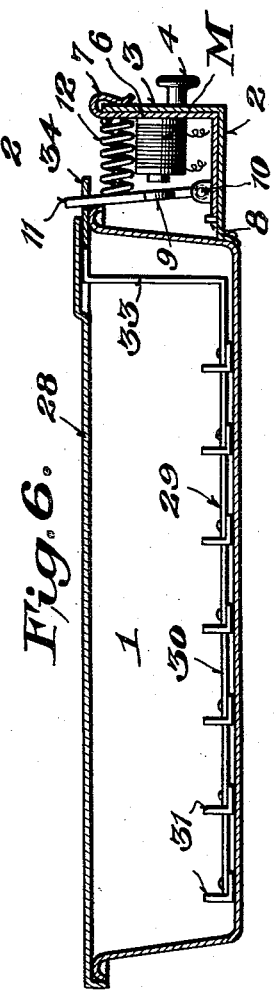

Patented May 7, 1935

2,000,021

UNITED STATES PATENT OFFICE 2,000,021

ICE CREAM FREEZER

Charles T. Hoffman and Emory L. Groff, Washington, D. C., assignors to Emory L. Groff, as trustee Application November 7, 1930, Serial No. 494,154

12 Claims. (Cl. 259—113)

This invention relates to ice cream freezers, and more particularly to a novel construction especially adapted for use in electrical refrigerators of the household type.

Electrical refrigerators of the "Frigidaire" and other types use rectangular oblong-shaped pans for the formation of ice cubes, and, according to the present practice, ice cream may be made in any one of these pans by removing the cellular division plate and simply allowing the ice cream mixture to freeze. While this method or practice is satisfactory to a degree, nevertheless there is no provision for agitating or stirring the ice cream mixture in accordance with the general method of making ice cream to render the finished product smooth and also keep the ingredients properly mixed.

Accordingly, the present invention has primarily in view the provision of an ice cream freezer conforming generally to the requirements of standard ice-forming pans so that a freezer constructed in accordance with the present invention may be readily substituted for one of such pans in a convenient and expeditious manner, thereby making it possible for users of all standards of electrical refrigerators to have an ice cream freezer that is inexpensive, easily handled, and adapted for use in just as simple a manner as the removal and replacing of the ice-forming pans in the evaporator freezing compartment.

A further object of the invention is to provide novel means for actuating the dasher or stirrer, the same being preferably electro-magnetically operated, and dispensing with a motor of the type heretofore employed in the art for driving a dasher or its equivalent. In the use of an electric motor of the type having a commutator and brushes, the usual odor incident to the operation of the motor as well as the formation of a certain amount of ozone is bound to contaminate the box which is necessarily kept closed, and which results in affecting the taste of the contents of the box. This objection, therefore, is entirely obviated by the present invention, thereby enhancing the value of the invention from a practical and sanitary viewpoint. In that connection the present construction obviates the necessity for having oil and the resulting odors in the box as would be the case with the use of motors having commutators, armature, and field.

Another object of the invention is to provide a complete self-contained unit in the sense that it may be readily handled for placing and removing the same from the box, and which may be readily taken apart and cleaned. To that end the invention also contemplates an actuator for the dasher which is detachably mounted or fitted to the pan so that the latter may be easily washed without in any way injuring the electrical apparatus.

With the above and other objects in view which will more readily appear as the nature of the invention is better understood, the same consists in the novel construction hereinafter more fully described, illustrated, and claimed.

A preferred and practical embodiment of the invention is shown in the accompanying drawings in which:

Figure 1 is a detail elevation of a portion of an ice-forming unit of an electrical icebox showing the application of the invention.

Figure 2 is a longitudinal sectional view of the novel construction.

Figure 3 is a vertical sectional view taken on the line 3—3 of Figure 2.

Figure 4 is a vertical sectional view taken on the line 4—4 of Figure 2.

Figure 5 is a detail top plan view of the construction shown in Figure 2.

Figure 6 is a longitudinal sectional view of a modified form of the invention.

Figure 7 is a detail perspective view of a "flasher button" used for establishing an intermittent supply of current to the electro-magnetic actuator.

Figure 8 is a detail sectional view showing one way of utilizing the "flasher button".

Referring to the drawings, A designates the cabinet of an electrical refrigerator having the door B, cooling compartment C, and a conventional ice-forming unit designated generally as D. This unit D is frequently referred to in the art as the evaporator, and in that connection it is to be understood that the evaporator has the usual means for controlling the same in accordance with the practice well known in the art to obtain the necessary degree of cold for obtaining freezing temperatures at the location of the evaporator and maintaining the cooling compartment C at a safe temperature. A conventional ice pan is also shown at E.

As previously indicated, a primary object of the invention is to provide an ice cream freezer that will fit in one of the ice pan compartments, and to that end it is proposed to utilize a standard ice pan or container in which the ice cream is made.

Before proceeding to a detailed description of the present novel ice cream freezing unit designated generally as F, it may be pointed out that the interior of the box may be provided with a standard porcelain or equivalent electrical outlet designated generally as G, the same having an electric cord H and a detachable plug P for connecting the terminals of the outlet G with a source of electric current either direct or alternating. Some electrical refrigerators now on the market are provided within the cooling compartment C with an electric socket. In that event the present invention is readily adaptable for immediate use with such types of installation. A feature of the invention, however, is to utilize a source of electrical current within, or led to a point within, the box so that the door may be closed in the usual manner.

Referring now more in detail to the form of ice cream freezer shown in Figures 1 to 5 inclusive, it will be observed that the same includes an oblong container or pan preferably of the same general dimensions and shape as the standard ice pan. The front wall 3 may have a handle 4 for permitting the handling or manipulation of the pan in a convenient manner. The bracket 2 is of angular cross-sectional formation and provides, in effect, a pocket for receiving a dasher actuator unit designated generally as K. This actuator unit is preferably an electro-magnetic device which is detachably fitted in the pocket formed by the bracket 2—3.

In the embodiment shown, the actuator K preferably includes an angular frame consisting of a bottom wall 5 and a vertical wall 6, the latter having a clamping flange portion 7 or its equivalent formed at the upper edge thereof for permitting the unit to be easily and quickly connected to the upstanding front wall 3 of the bracket. Merely by placing the frame 5—6 downwardly in the pocket formed by the bracket 2—3 and fitting the clamping flange 7 over the upper edge of the wall 3 the entire actuator unit is effectively held in place. To insure the stability of the actuator in its operating position a tongue or tongues 8 may be struck up from the bottom wall of the bracket 2 to form an abutment for the front edge of the bottom wall 5 of the frame.

The vertical wall 6 of the actuator frame has mounted thereon in any suitable manner one or more electro-magnets M. These electro-magnets are adapted to cooperate with an armature member 9 which is pivotally mounted as at 10 to the bottom wall 5 of the frame whereby the upper end or arm 11 of the armature may have a relatively swinging movement for the purpose of operating the dasher as will presently appear.

The armature 9 is urged in one direction by a suitable spring 12 and is moved in the other direction by the energization of the electro-magnets M thereby to insure a reciprocating motion of the armature which motion is in turn communicated to the dasher construction. The electro-magnets M are preferably arranged in series and are connected by the wires 13—13 in the form of the usual electric connector cord 14 with a plug 15 adapted to fit in the receptacle G. The plug 15 includes the usual detachable head 16 and the screw shell plug portion 17 which is adapted to fit into the screw shell portion 18 of the receptacle G which has the usual central plug contact 19.

When the ice cream freezer is in use a "flasher button" 20 is inserted between the center contact of the screw plug 17 and the center contact 19 of the receptacle G. This "flasher button" is of the conventional type now on the market and shown for example in United States Patents Nos. 1,400,914, 1,602,088, and 1,683,992, dated December 20, 1921, October 5, 1926, and September 11, 1928. The said "flasher button" 20 produces an intermittent current in the well-known manner, and the intermittent current produced by the use of this "flasher button" intermittently energizes the electro-magnets M to produce an intermittent actuation of the armature 9 against the pressure of the spring 12. Thus, it will be apparent that the present actuator may be readily operated to provide a source of reciprocating power for the dasher construction.

The upper end 11 of the armature member 9 is adapted to be connected to any type of reciprocating dasher, either of the type shown in Figure 2 or of the type shown in Figure 6.

Referring to the dasher construction shown in Figure 2 it will be observed that the same preferably includes a cover plate 21 having a slot or opening 22 for receiving the armature extension 11. This cover plate carries on its underside a plurality of mixing and scraping blades 23 which are preferably of the open construction shown in Figure 3 and have their lower ends 24 preferably inclined to assist in the mixing or stirring action. Owing to the fact that the cover plate 21 is intended to slide or reciprocate on the upper edges 1a of the pan 1 it is preferred to provide the rear end of the pan with a fixed cover member 25. This member is of preferably channel-shaped cross-section and has a closed end wall 26 and the depending hook-like flanges 27 for engaging beneath the bead formation at the upper edges 1a of the pan. Thus this member 25 and the cover plate 21 not only completely enclose the pan, but also the member 25 assists in holding the inner end of the dasher construction against upward movement; in other words, it acts as a guide for the lower end of the dasher as well as completing the closure of the inner end of the pan.

In the embodiment just described the dasher means constitutes the cover of the pan. However, in the embodiment shown in Figure 6 the cover 28 does not move. According to this embodiment the dasher 29 includes a member 30 having a plurality of agitating or scraping blades 31 adapted to lie at the bottom of the pan and the said member 31 is continued upwardly as indicated at 33 and thence outwardly as indicated at 34 where it may be suitably connected with the upper end 11 of the armature. Clearly, as the armature 11 reciprocates the dasher 29 will be moved but the cover will remain stationary. Thus, it is within the scope of the invention to provide either a fixed cover or a movable cover for the pan as indicated by the constructions of Figures 2 and 6.

From the foregoing it will be observed that the present invention contemplates the combination with the freezing compartment of an evaporator unit, of a removable pan-like ice cream freezer carrying therewith an actuator that may be readily and easily connected to a source of electrical power. In its general aspects the invention includes an oblong rectangular pan having agitating and stirring means therein, the said agitating means being provided with an extension or handle exposed at the front end of the pan for proper manipulation or operation. The actuator K shown in the drawings is to be understood as exemplifying one means for effecting the reciprocating movement of the dasher, and it will, of course, be understood that changes may be resorted to in the unit within the scope of the appended claims, as conditions may require.

A further distinctive feature of the invention is to provide an actuating unit which may be readily detached from the pan, but when associated therewith may be readily used in combination with a source of intermittent electrical current.

According to Figure 2 the agitating and scraping means constitute a dasher which is supported on the top of the container, while according to Figure 6 the agitating and scraping means provide a dasher which operates on the bottom of the pan. In either case the agitating and scraping means or so-called dasher means will serve to maintain the ice cream mixture properly mixed and will also bring the frozen mixture toward the center of the container.

In connection with the so-called "flasher button" shown in Figures 7 and 8, it will be understood that this type of device is shown by way of example, and any thermally controlled self-opening and self-closing means which will change constant current, whether direct or alternating, to intermittent current may be used. While for the sake of convenience it is preferred to arrange the means for changing the constant current to intermittent current within the cooling compartment of the refrigerator, nevertheless it will be understood that the purpose of the invention will be served by locating the current changing means at any point in the line of current supply to the electrical actuator.

In use the ice cream mixture may be placed in the container 1 and the entire device fitted in the freezing chamber or compartment of the evaporator. When the mixture has become sufficiently frozen, the plug 15 may be withdrawn from the receptacle and the entire ice cream freezer removed from the ice chamber or evaporator. The dasher means may then be removed and the entire electrical actuator K can also be removed from the pan and the container reinserted in the freezing chamber to keep the ice cream frozen. Since the dasher means and the actuating unit K are readily separable the entire container may be readily washed and the dasher may also be cleaned without danger of injury to the electrical elements of the actuator K. The entire unit is capable of ready assembly and disassembly, as will be apparent from the manner in which the various units are constructed.

It will, of course, be understood that, although a single ice cream freezing unit has been shown in the drawings in connection with the evaporator freezing compartment, any desired number of these units may be used in multiple. That is to say, as many units can be used as there are freezing compartments in the evaporator, and all of such units may be used in connection with a single current changing device by the mere insertion of a multiple receptacle plug in the outlet G.

The "flasher button" or circuit interrupter shown at 20 in Figure 7 may be of the "fast" or "slow" type.

A further object of the invention is illustrated in Figure 2 wherein the pan or container 1 is provided with a division plate P. This plate completely divides the container into two compartments, making it possible to freeze two different ice cream mixtures in the same pan. Heretofore, in the use of ice cream freezers it has been impractical to make two different kinds of ice creams or ices in the same container. However, with the present type of dasher or agitator this is entirely feasible as will be readily apparent, and it will, of course, be understood that if more than one division plate is desired it is within the scope of the invention to use more than one. The dasher means of Figure 2 will readily agitate or stir the different mixtures and the division plate P will also act as a baffle to prevent undue movement or splashing of the mixture before the same starts to freeze.

Without further description it is thought that the features and the advantages of the invention will be readily understood by those skilled in the art.

We claim:—

1. An ice cream freezer adapted to be placed in a refrigerator compartment including a container adapted to be inserted in and removed from said compartment, an electro-mechanical actuator carried by the container, agitating means within the container operatively connected with said actuator, a constant source of electrical current, means for changing said current from the constant source to an intermittent current, and an electrical connection between said electromechanical actuator and said means for changing the constant current to intermittent current.

2. An ice cream freezer adapted to be placed in a refrigerator compartment, including agitating and scraping means, an outlet device for a constant source of electrical current in the cooling compartment, an electrical actuator device carried by the container and operatively connected with the agitating and scraping means, an electrical connection for the electrical actuator device adapted to be detachably connected with the outlet, and a current changing device interposed between said electrical connection and the terminals of the outlet.

3. An ice cream freezer comprising a pan-like contained, dasher means within the container, an electro-mechanical actuator unit detachably fitted to the pan and also detachably connected with the dasher means, and means for supplying current to said electro-mechanical actuator device.

4. An ice cream freezer including a pan-like container, a support on the container, an electromechanical dasher actuating device detachably connected to said support, and dasher means detachably connected to said actuator and having a portion lying within the container.

5. An ice cream freezer unit adapted to be inserted in the ice pan compartment of the evaporator of an electric refrigerator comprising a container, dasher means in the container, and an actuator connected with the container and adapted to be operatively connected with the dasher means, said actuator including a spring-controlled armature member, electro-magnets for operating said armature, and an electrical cord connected with the electro-magnets adapted to be connected with a source of current.

6. An ice cream freezer comprising a container, agitating and scraping means for the container including a cover plate carrying agitating elements, said cover plate being adapted to ride on the upper edges of the container, a fixed cover plate detachably engaging with the rear end of the container and overlying one end of the dasher cover plate, an actuator for the dasher supported by the container, and an operative connection between the dasher and said actuator.

7. An ice cream freezer unit adapted to be inserted in the ice pan compartment of an electric refrigerator comprising a container, dasher means for the container, and an electro-mechanical dasher actuating device carried by the container, said device including a frame adapted to be detachably fitted to the container, an electro-magnet carried by the frame, an armature pivoted to the frame in operative relation to the electromagnet, said armature being adapted to be operatively connected with the dasher means, and a spring arranged between the armature and a portion of the frame for moving the armature in opposition to the electro-magnetic force of the magnet.

8. An ice cream freezer including in combination, a container, dasher means for the container, an electrical actuator for the dasher, an electrical connection for said electrical actuator, a constant source of electrical current, and a thermostatic device included in circuit between said electrical connection and the constant source of electrical current for changing the latter to intermittent electrical current in said electrical connection.

9. An ice cream freezer including a pan-like container, a partition plate arranged transversely of the container, dasher means for the compartments of the pan formed by the division plate, and means for operating the dasher.

10. An ice cream freezer adapted to be used in an electrical refrigerator interchangeably with any of the standard ice pans positioned in the evaporator compartment, including a pan, agitating means therein, and actuating means for said agitating means, said actuating means including an electric motor carried by the pan and lying wholly within planes defining the upper and lower limits of the pan.

11. An ice cream freezer adapted to be used in an electrical refrigerator interchangeably with any of the standard ice pans positioned in the evaporator compartment, including a pan having an end wall, agitating means within the pan, a support carried by the end wall, and an electric motor detachably carried by said support and operatively connected with the agitating means, said electric motor lying within planes defining the upper and lower limits of the pan whereby accessibility and removability of other ice pans positioned in the compartments will not be interfered with.

12. An ice cream freezer adapted to be used in an electrical refrigerator interchangeably with any of the standard ice pans positioned in the evaporator compartments including a pan, agitating means within the pan, and an electro-magnetic motor carried by one end of the pan and lying within planes defining the upper and lower limits of said pan.

CHARLES T. HOFFMAN.
EMORY L. GROFF.